Dec. 17, 1968 W. O. MONGESKU 3,416,486

DIAL INDICATOR APPARATUS FOR RADIO RECEIVER

Filed April 29, 1966

INVENTOR:
WILLIAM O. MONGESKU,
BY William S. Wolfe
HIS ATTORNEY.

United States Patent Office 3,416,486
Patented Dec. 17, 1968

3,416,486
DIAL INDICATOR APPARATUS FOR RADIO RECEIVER

William O. Mongesku, Syracuse, N.Y., assignor to General Electric Company, a corporation of New York
Filed Apr. 29, 1966, Ser. No. 546,451
10 Claims. (Cl. 116—124.1)

ABSTRACT OF THE DISCLOSURE

A dial indicator apparatus for a radio receiver wherein a dial cord is strung over integral bosses with the desired tension without the necessity for pulleys or springs, the ends of the dial cord being automatically clamped to a tuning capacitor drum by the provision of dogs thereon.

The present invention relates to a dial indicator apparatus for a radio receiver and like devices and more specifically to an improved dial stringing arrangement for such a receiver.

It is conventional to employ a dial cord to transport a suitable dial pointer in a radio receiver. The dial cord engages a drum attached to the tuning capacitor in such a manner that the position of the pointer corresponds to the angular position of the tuning capacitor, the pointer thus providing an indication of the particular operating frequency selected.

More specifically in the prior art arrangement, a first end of the dial cord is tied to the tuning drum, the cord then passing around a suitable drive windlass having a control knob attached thereto. The cord then passes through a system of pulleys which achieves a 180 degree reversal of the cord and returns the cord to the tuning capacitor drum. The second end of the cord is then tied to a spring member attached to the tuning drum, the spring member providing the desired tension in the cord. A suitable dial pointer assembly is then attached to the cord.

The prior art dial stringing arrangement was both complicated and unduly expensive due to the necessity for a plurality of pulleys and related elements. Further, the spring tensioning element employed in the prior art also added undue complexity and cost to the radio receiver. Even further, the prior art arrangement was difficult to assemble since the dial cord had to be tied to the tuning capacitor drum and strung through the relatively complicated pulley system.

The present invention provides a simplified dial stringing arrangement which is easily assembled to a radio receiver.

Accordingly, an object of the invention is to provide an improved dial stringing arrangement for a radio receiver.

Another object is to provide a dial stringing arrangement that is less complicated than the prior art arrangements.

Another object is to provide a dial stringing arrangement that is less expensive than the prior art arrangements.

A further object is to provide a dial stringing arrangement that is easily assembled to a radio receiver.

These and other objects are achieved in one embodiment of the invention by the stringing of the dial cord over bosses molded integrally with the dial background thereby eliminating the necessity for pulleys. In addition, a plurality of alignment fingers integrally molded with the dial background are provided to retain the cord in the desired position on the bosses. Further, a molded tuning capacitor drum is employed having a pair of dogs positioned thereon for automatically clamping and retaining the respective ends of the dial cord thereby eliminating the necessity for tying the cord to the drum.

Figure 1:
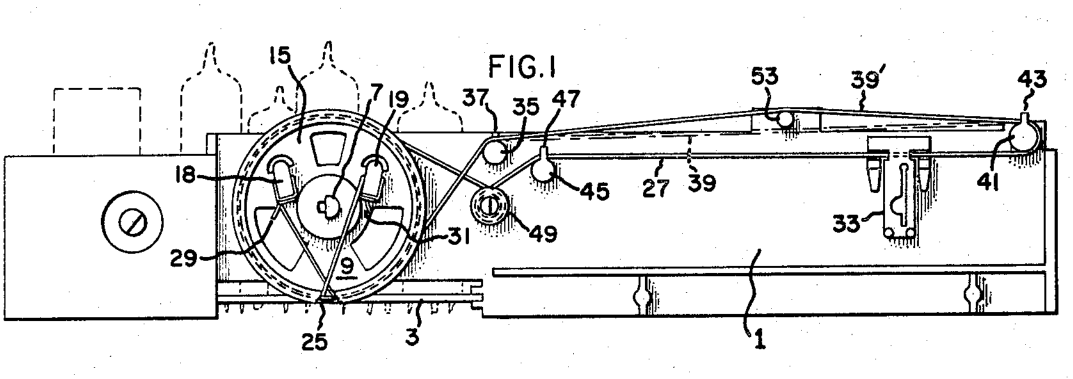
Figure 2:
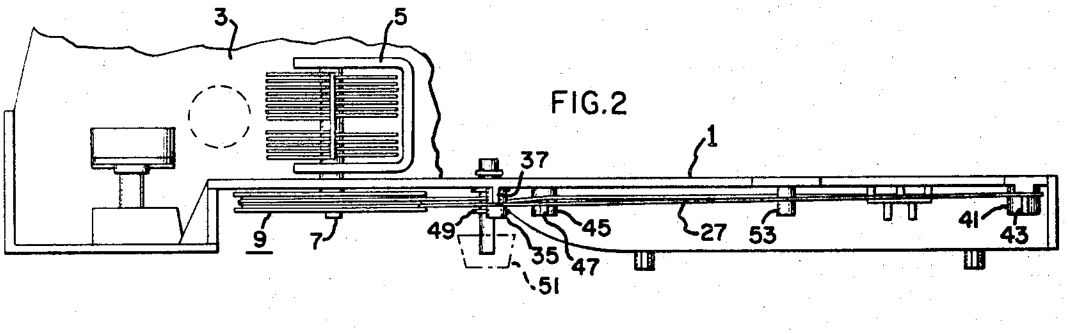
Figure 3:
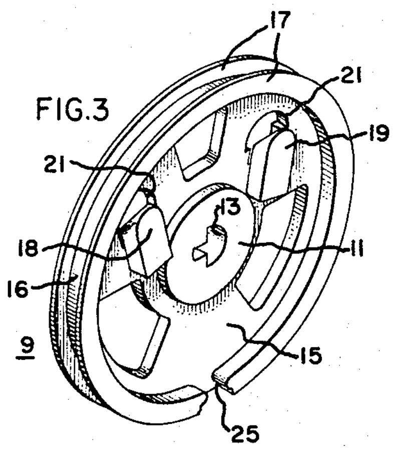
Figure 4:
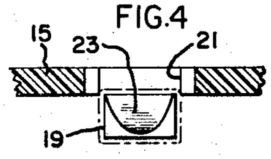

The novel and distinctive features of the invention are set forth in the appended claims. The invention itself together with further objects and advantages thereof may best be understood by reference to the accompanying drawings in which:

FIGURE 1 is a front view of a radio receiver chassis employing the dial stringing arrangement of the invention, FIGURE 2 is a top view of the arrangement shown in FIGURE 1, FIGURE 3 is a perspective view of the tuning capacitor drum shown in FIGURES 1 and 2, and FIGURE 4 is a partial sectional view of one of the dogs shown in FIGURE 3.

Referring to FIGURES 1 and 2 there is shown a radio chassis generally comprising a molded dial background 1 and a component bearing circuit board 3 assembled thereto. A conventional tuning capacitor 5 having an extending shaft 7 is positioned on the circuit board 3, the shaft 7 extending through a suitable aperture in the dial background 1.

A molded tuning capacitor drum shown generally at 9 is affixed to the extending shaft 7. The drum 9 which is most clearly shown in FIGURE 3 comprises a central hub portion 11 having an aperture 13 therein adapted to lockedly receive the shaft 7 of the tuning capacitor 5. The drum 9 further includes a web portion 15, an integral rim portion 16 and a pair of spaced integral flange portions 17. In accordance with an important feature of the invention, the web portion 15 is provided with a pair of integrally molded dogs 18 and 19 which serve to automatically captivate the ends of the dial cord. An aperture 21 shaped as shown is positioned under each of the dogs 18 and 19.

The relationship of the dogs 18 and 19 to the web portion 15 of the drum 9 is most clearly seen from the partial sectional view of FIGURE 4. As depicted, the portion of the dogs 18 and 19 overlying the associated aperture 21 is tapered to facilitate placement of the dial cord beneath the dog.

The flanges 17 of the drum 9 are provided with a slot 25 to permit ingress and egress of the dial cord from the dogs 18 and 19 to a position overlying the rim 16.

Referring again to FIGURES 1 and 2 the manner in which the dial cord is strung in accordance with the invention is shown. As depicted, a dial cord 27 having first and second ends 29 and 31 respectively is affixed to the drum 9 so as to position a dial pointer carriage 33 in accordance with the particular operating frequency selected. A dial pointer (not shown) is affixed to the carriage 33 and a suitable dial scale (not shown) is associated therewith in conventional fashion. The first end 29 of the dial cord 27 is captivated by the dog 18 by taking two or more turns of the cord around the dog, each turn being pulled up tightly under the dog and the cord thus becoming wedged between the dog 18 and the web portion 15. The cord then passes from the dog 18 through the slot 25 in the flange 17 and passes completely around the rim 16 of the drum in a counterclockwise direction. The cord then passes over a generally cylindrical boss 35 molded integrally with the dial background 1 and having a projecting alignment finger 37 which engages the dial cord 27 to maintain the dial cord in the desired position on the boss 35.

The dial cord then passes as shown by the dotted lines 39 to a second integrally molded, generally cylindrical boss 41 having a projecting alignment finger 43 positioned thereon in a similar manner to the projecting finger 37 on boss 35. However, the alignment fingers 43 urges the dial cord in the opposite direction to that of the alignment finger 37, the oppositely acting forces thus produced thereby maintaining the dial cord in the desired position on the bosses 35 and 41.

The dial cord then takes a half turn arround the boss 43 and subsequently passes over a third integrally molded, generally cylindrical boss 45 having a projecting alignment finger 47 similar to that of the boss 41. The dial cord then passes to a driving windlass 49 rotatably secured to the dial background 1, the driving windlass being provided with a tuning knob 51 as shown in FIGURE 2. Several turns of the dial cord 27 are taken around the windlass 49 and the dial cord then passes around the rim 16 of the drum 9 in a counterclockwise direction and passes through the slot 25 to the dog 19. The end 31 of the dial cord 27 is then given two turns around the dog 19, each turn being pulled up tightly under the dog and the end 31 thus being automatically captivated in the same manner as discussed above in connection with end 29 without the necessity for tying the dial cord to the drum.

It will be appreciated that although as depicted the various alignment fingers have been shown as extending from the bosses themselves, in some applications alignment fingers separate from the bosses might be employed.

In accordance with another feature of the invention, the dial cord 27 as shown in FIGURE 1 is deflected from the straight line path between the bosses 35 and 43 indicated by the dotted lines 39 to the position indicated by 39' so as to tension the cord in the desired fashion. The desired deflection is achieved by passing the threaded cord over an integrally molded boss 53. The deflection of the cord over the boss 53 is sufficient to provide the necessary cord tension thereby eliminating the discrete spring elements commonly employed in the prior art. It will be appreciated that in some applications the boss 53 may not be necessary and sufficient tension can be obtained through the action of the bosses 35, 41 and 45 alone.

The operation of the arrangement of the invention is evident from FIGURE 1 in that a clockwise rotation of the tuning knob 51 results in the carriage 33 being transported from the left-hand side to the right-hand side of FIGURE 1 while a counterclockwise rotation of the tuning knob 51 results in the carriage being transported in the opposite direction.

In a preferred embodiment of the invention the dial background including the integral bosses and alignment fingers is injection molded from a polystyrene material, the tuning capacitor drum is injection molded from a high impact polystyrene material and an indicator cord formed from a 2% maximum stretch Dacron cord is employed.

Thus in accordance with the invention a dial stringing arrangement is provided which completely eliminates the pulleys, springs and associated devices employed in the complicated prior art system through the use of integrally molded bosses and alignment fingers to guide and support the dial cord. Further, through the use of the molded tuning capacitor drum of the invention having integrally molded bosses thereon the assembly of the indicator cord to the drum is greatly simplified since a tying operation as required in the prior art is eliminated, the ends of the indicator cord automatically being captivated by the integral dogs on the drum.

Although the invention has been described with respect to certain specific embodiments, it will be appreciated that modifications and changes may be made by those skilled in the art without departing from the true spirit and scope of the invention.

What is claimed as new and desired to be secured by Letters Patent of the United States is:

1. In a radio receiver chassis having positioned thereon a tuning capacitor including a rotatable shaft for selecting a desired operating frequency, apparatus for indicating the selected operating frequency comprising;

(a) a drum member fixably connected to said shaft of said tuning capacitor for rotation therewith, (b) said chassis being formed with a plurality of integrally molded laterally extending bosses, (c) a drive cord wrapped around and attached at each end to said drum, (d) intermediate portions of said cord engaging and being supported by said bosses so that motion of said cord across said bosses results in rotation of said drum, (e) dial pointer means attached to said cord for movement therewith, and (f) a rotatable windlass rotatably connected to the chassis, an intermediate portion of said cord being wrapped around said windlass so that rotation of said windlass results in rotation of said drum.

2. The apparatus defined in claim 1 wherein said bosses are generally cylindrical and provide with said drum the sole support for said cord.

3. The apparatus defined in claim 1 wherein each of said bosses is provided with an integrally molded laterally extending restraining finger selectively exerting oppositely directed restraining forces on said cord to position said cord on said bosses.

4. The apparatus defined in claim 2 wherein one of said restraining fingers extends from each of said bosses.

5. The apparatus defined in claim 1 wherein the chassis includes a molded dial background and said bosses are integrally molded therewith.

6. The apparatus defined in claim 1 wherein an integrally molded tensioning member is provided, said tensioning member being poistioned adjacent the straight line path between a pair of said bosses and engaging said cord to cause said cord to deviate from said straight line path.

7. The apparatus defined in claim 1 wherein said drum comprises;

(a) a central hub portion engaging the shaft of the tuning capacitor, (b) a web portion surrounding said hub portion, (c) a rim affixed to the periphery of said web portion, (d) a pair of spaced flanges positioned on each side of said rim in spaced relationship one to the other, and (e) first and second dogs positioned on said web portion and integrally molded therewith, the ends of said cord being captivated by said dogs.

8. The apparatus defined in claim 7 wherein said dogs comprise integrally molded projections on said web, an aperture being provided in said web under a portion of each dog.

9. The apparatus defined in claim 8 wherein the portion of each dog overlying the associated aperture is tapered to facilitate captivating of said cord.

10. The apparatus defined in claim 9 wherein each end of said cord is captivated by an associated one of said dogs by wrapping said cord around said dog to wedge said cord between said dog and said web.

References Cited

UNITED STATES PATENTS

| | | | |
|---|---|---|---|
| 1,989,490 | 1/1935 | Millen | 116—124.1 |
| 2,397,306 | 3/1946 | Whipple | 116—124.1 |
| 2,502,223 | 3/1950 | Kennedy | 116—124.1 |
| 2,556,875 | 6/1951 | Hallstrand et al. | 116—124.1 |
| 2,582,951 | 1/1952 | Barry | 116—124.1 |
| 2,606,239 | 8/1952 | Beste | 116—124.1 |
| 3,089,191 | 5/1963 | Conrad | 18—10 |

FOREIGN PATENTS

| | | |
|---|---|---|
| 102,716 | 12/1937 | Australia. |

LOUIS J. CAPOZI, *Primary Examiner.*